United States Patent [19]

Matsumoto

[11] Patent Number: 5,617,410
[45] Date of Patent: Apr. 1, 1997

[54] CDMA COMMUNICATION WITH A PROPAGATION DELAY BETWEEN A BASE AND A MOBILE STATION TAKEN INTO ACCOUNT

[75] Inventor: Mariko Matsumoto, Tokyo, Japan

[73] Assignee: NEC Corporation, Tokyo, Japan

[21] Appl. No.: 404,503

[22] Filed: Mar. 15, 1995

[30] Foreign Application Priority Data

Mar. 15, 1994 [JP] Japan ..................................... 6-069867

[51] Int. Cl.$^6$ .................................................. H04J 13/04
[52] U.S. Cl. ........................ 370/342; 370/350; 370/508; 379/59; 455/33.1; 455/51.1; 455/54.1
[58] Field of Search ......................... 370/18, 95.3, 100.1, 370/103, 104.1; 379/58, 59, 63; 455/51.1, 54.1, 33.1; 375/205, 200

[56] References Cited

U.S. PATENT DOCUMENTS

| 4,984,247 | 1/1991 | Kaufmann et al. | 375/200 |
| 5,111,478 | 5/1992 | McDonald | 375/200 |
| 5,235,615 | 8/1993 | Omura | 379/59 X |

FOREIGN PATENT DOCUMENTS

| 0361299 | 4/1990 | European Pat. Off. | H04B 7/26 |
| WO93/21698 | 10/1993 | WIPO | H04B 7/26 |

OTHER PUBLICATIONS

Patent Abstracts of Japan, vol. 16, No. 462 (E–1269), Sep. 25, 1992 & JP–A–04 162840, Jun. 8, 1992.

*Primary Examiner*—Benedict V. Safourek
*Assistant Examiner*—Russell W. Blum
*Attorney, Agent, or Firm*—Scully, Scott, Murphy & Presser

[57] ABSTRACT

In a CDMA communication network, each base station (BS) is made to establish synchronism between a downward transmission signal directed to a mobile station (MS) and an upward reception signal received from the mobile station by adjusting in the mobile station a mobile generated SS pattern into an adjusted SS pattern of producing an upward transmission signal for reception at the base station as the upward reception signal. In order to get the adjusted SS pattern, the base station inserts in the downward transmission signal an inserted signal representative of a propagation delay t(D) between the base and the mobile stations and a propagation delay increment t(d) while the mobile station is in a preliminary state of receiving the downward transmission signal as a downward reception signal first from the base station and is in a steady state, respectively. The signals may ba propagated through at least one communication satellite. Preferably, each mobile station comprises a delay circuit (53) for synchronizing the adjusted SS pattern with an adjusted time, which is equal to t(B)–t(D) and to t(B)–t(d) in the preliminary and the steady states, where t(B) represents a base station absolute time at which a base generated SS pattern is generated for downward transmission signals directed to mobile stations covered by the base station.

15 Claims, 3 Drawing Sheets

CDMA COMMUNICATION WITH A PROPAGATION DELAY BETWEEN A BASE AND A MOBILE STATION TAKEN INTO ACCOUNT

BACKGROUND OF THE INVENTION

This invention relates to code division multiple access (CDMA) communication between a base station and a mobile station typically through a communication satellite and, more particularly, to a code division multiple access communication method and a base and a mobile station for use in the code division multiple access communication.

A satellite communication network comprises a plurality of terrestrial stations in a service area within which at least one communication satellite is always in line of sight. Each terrestrial station can exchange radio communication to and from a selected one of the other terrestrial stations through at least one of the communication satellites. It is possible for the terrestrial stations to concurrently access at least one of the satellites by multiple access techniques including frequency division, time division or code division multiple access.

Ordinarily, one of the terrestrial stations serves as a source station for a particular communication signal and another, as a destination station for the particular communication signal. The terrestrial stations often comprise at least one base station and a plurality of mobile stations movable in the service area. One of the mobile stations will be taken into consideration as a representative and will he referred to simply as a mobile station.

When transmitted from the base station to the mobile station, the communication signal is herein called a downward transmission signal. The mobile station receives the downward transmission signal as a downward reception signal. Alternatively, the mobile station transmits an upward transmission signal to the base station. The upward transmission signal is received by the base station as an upward reception signal.

According to the code division multiple access technique, each code division multiple access communication network is assigned with a particular code, typically, a particular spectrum spread pattern. In order to provide such a spectrum spread pattern, the base station comprises a base station spectrum spread pattern generator for generating a base generated spectrum spread pattern. The mobile station comprises a mobile station spectrum spread pattern generator for generating a mobile generated spectrum spread pattern. The base station transmits the downward transmission signal by modulating a base transmission signal by the base generated spectrum spread pattern. The mobile station transmits the upward transmission signal by modulating a mobile transmission signal by the mobile generated spectrum spread pattern.

With a propagation delay dependent on a distance between the base and the mobile stations, the downward transmission signal is received as the downward reception signal and the upward transmission signal as the upward reception signal. Consequently, the base station comprises a base station synchronizing unit for synchronizing the base generated spectrum spread pattern with the upward reception signal to produce a base synchronized spectrum spread pattern. The mobile station comprises a mobile station synchronizing unit for synchronizing the mobile generated spectrum spread pattern with the downward reception signal to produce a mobile synchronized spectrum spread pattern. The base station demodulates the upward reception signal into a base reception signal by the base synchronized spectrum spread pattern. The mobile station demodulates the downward reception signal by the mobile synchronized spectrum spread pattern.

In a code division multiple access communication network, each terrestrial station can deal with only a small number of communication. The code division multiple access communication is nevertheless suitable when the terrestrial stations are great in number. In addition, the code division multiple access communication is scarcely adversly affected by interference and disturbances. This applies to communication between a base station and a great number of mobile stations.

It should, however, be noted that the base generated spectrum spread pattern is produced in synchronism with a base station absolute time. The downward transmission signal or signals therefore have frames based on the base station absolute time. The mobile generated spectrum spread pattern is generated in synchronism with a mobile station absolute time which is specific or individual to the mobile station under consideration. The upward transmission signals have frames based on individual mobile station absolute times. For reception as the upward reception signal from one of the mobile stations that is referred to merely as the mobile station in the foregoing, the upward transmission signal must have frames which are not based on the mobile generated or synchronized spectrum spread pattern specific thereto but are related to the base station absolute time. It is, however, difficult due to either a propagation delay or a variation therein to determine a transmisson timing of the upward transmission signal. This has given rise to quality and sensitivity deteriorations of the base reception signal.

SUMMARY OF THE INVENTION it is consequently an object of the present invention to provide a code division multiple access communication method which makes use of a spectrum spread pattern in a base station for demodulating an upward reception signal into a base reception signal with improved quality.

It is another object of this invention to provide a code division multiple access communication method which is of the type described above and in which the upward reception signal is demodulated in a base station into the base reception signal with a raised reception sensitivity.

It is still another object of this invention to provide a code division multiple access communication method which is of the type described above and in which a mobile station produces an adjusted spectrum spread pattern for use in modulating a mobile transmission signal into an upward transmission signal for reception at the base station as an upward reception signal of the type described above.

It is yet another object of this invention to provide a code division multiple access communication method which is of the type described above and in which the adjusted spectrum spread pattern is produced by taking into account a propagation delay between the base and the mobile stations.

It is a further object of this invention to provide a base station for use in the code division multiple access communication method of the type described above.

it is a still further object of this invention to provide a mobile station for use in the code division multiple access communication method of the type described above.

Other objects of this invention will become clear as the description proceeds.

In accordance with an aspect of this invention, a code division multiple access communication method is provided comprising the steps of generating at a base station a base generated spectrum spread pattern, modulating a base transmission signal by the base generated spectrum spread pattern into a downward transmission signal for reception at a mobile station as a downward reception signal, synchronizing the base generated spectrum spread pattern with an upward reception signal received from the mobile station to produce a base synchronized spectrum spread pattern, demodulating the upward reception signal by the base synchronized spectrum spread pattern into a base reception signal, generating at the mobile station a mobile generated spectrum spread pattern, modulating a mobile transmission signal by using the mobile generated spectrum spread pattern as an adjusted spectrum spread pattern into an upward transmission signal for reception at the base station as the upward reception signal, synchronizing the mobile generated spectrum spread pattern with the downward reception signal to produce a mobile synchronized spectrum spread pattern, and demodulating the downward reception signal by the mobile synchronized spectrum spread pattern into a mobile reception signal, wherein the code division multiple access communication method comprises the steps of: (A) detecting at the base station a base station delay datum between the base generated and synchronized spectrum spread patterns, (B) inserting the base station delay datum into the downward transmission signal as an inserted delay datum; and (C) adjusting at the mobile station the mobile generated spectrum spread pattern into the adjusted spectrum spread pattern in response to the inserted delay datum.

In accordance with a different aspect of this invention, there is provided a base station which is for use in a code division multiple access communication network comprising a mobile station and which comprises a spectrum spread pattern generator for generating a base generated spectrum spread pattern, modulator means for modulating a base transmission signal by the base generated spectrum spread pattern into a downward transmission signal for reception at the mobile station as a downward reception signal, synchronizing means for synchronizing the base generated spectrum spread pattern with an upward transmission signal received from the mobile station as an upward reception signal to produce a base synchronized spectrum spread pattern, and demodulator means for demodulating the upward reception signal by the base synchronized spectrum spread pattern into a base reception signal, wherein the base station further comprises: (A) detecting means for detecting a base station delay datum between the base generated and synchronized spectrum spread patterns: and (B) inserting means for inserting the base station delay datum into the downward transmission signal as an inserted delay datum.

In accordance with a further different aspect of this invention, there is provided a mobile station which is for use in a code division multiple access communication network comprising a base station comprising, in turn, a base station spectrum spread pattern generator for generating a base generated spectrum spread pattern, base station modulator means for modulating a base transmission signal by the base generated spectrum spread pattern into a downward transmission signal for reception by the mobile station as a downward reception signal, base station synchronizing means for synchronizing the base generated spectrum spread pattern with an upward reception signal received from the mobile station to produce a base synchronized spectrum spread pattern, and base station demodulator means for demodulating the upward reception signal by the base synchronized spectrum spread pattern into a base reception signal, and further comprising detecting means for detecting a base station delay datum between the base generated and synchronized spectrum spread patterns and inserting means for inserting the base station delay datum into the downward transmission signal as an inserted delay datum, and which comprises a mobile station spectrum spread pattern generator for generating a mobile generated spectrum spread pattern, mobile station modulator means for modulating a mobile transmission signal by using the mobile generated spectrum spread pattern as an adjusted spectrum spread pattern into an upward transmission signal for reception at the base station as the upward reception signal, mobile station synchronizing means for synchronizing the mobile generated spectrum spread pattern with the downward reception signal to produce a mobile synchronized spectrum spread pattern, and mobile station demodulator means for demodulating the downward reception signal by the mobile synchronized spectrum spread pattern into a mobile reception signal, wherein the mobile station comprises adjusting means for adjusting the mobile generated spectrum spread pattern into the adjusted spectrum spread pattern in response to the inserted delay datum.

DESCRIPTION OF THE PREFERRED EMBODIMENT

Figure 1:
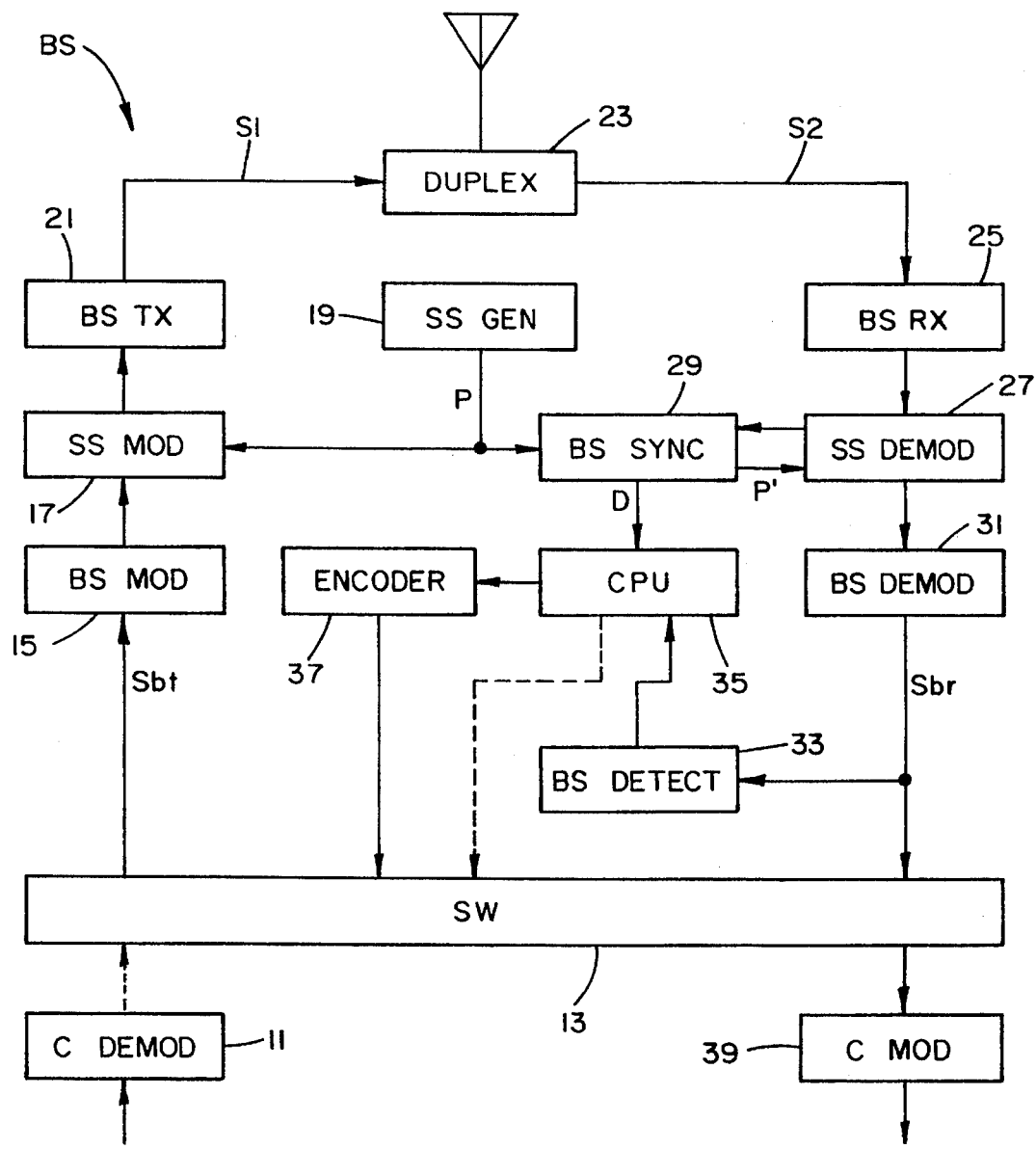
FIG. 1 is a block diagram of a base station for use in a code division multiple access communication network according to an embodiment of the instant invention.

Referring to FIG. 1, a base station BS is illustrated for use in a code division multiple access (CDMA) communication network according to a preferred embodiment of the present invention. The code division multiple access communication network has a service area which can provide world-wide coverage in a widest case. The CDMA network is used for dealing with radio communication with information signals modulated by SS (spectrum spread) patterns between the base station and a plurality of mobile stations which are either at a standstill or are moving in the service area.

Typically, the radio communication is carried out through at least one communication satellite which is not shown but is on a line of sight from the service area. Although called "multiple access", radio signals for the radio communication need not be transmitted through the satellite but may be transmitted directly between the base station and the mobile stations provided that the radio signals reach from the base station to the mobile stations and from the mobile stations to the base station.

In the example being illustrated, the base station BS is connected to a center station (not shown) together with similar base stations which are identical in structure and are not depicted. The center station sends censer transmission signals to such base stations and receives center reception signals from the base stations.

The center transmission signals are distributed to the base stations. Merely for simplicity of the description, attention will be directed to only one of the center transmission signals that is sent to the base station BS. In the base station, the center transmission signal is demodulated by a center signal demodulator (C DEMOD) 11 into a base transmission signal Sbt. Through a base station switch (SW) 13, the base transmission signal is delivered to a base station modulator (BS MOD) 15 and thence to a base station SS modulator (SS MOD) 17.

A base station SS pattern generator (SS GEN) 19 generates a base generated SS pattern P in synchronism with a base station absolute time t(B). By the base generated SS pattern, the base station SS modulator 17 SS modulates the base transmission signal into a downward base SS modulated signal. A base station transmitter (BS TX) 21 converts the downward base SS modulated signal to a downward transmission signal S1. Through a base station duplexer (DUPLEX) 23 which is a filter in the manner known in the art, the downward transmission signal is fed to a base station antenna which is symbolically illustrated. By the base station antenna, the downward transmission signal is transmitted towards the mobile stations which include a destination station.

In the meantime, an upward reception signal S2 arrives at the base station antenna from a source station of the mobile stations. Through the base station duplexer 23, the upward reception signal is supplied to a base station receiver (BS RX) 25 which produces an upward base SS modulated signal for delivery to a base station SS demodulator (SS DEMOD) 27.

Supplied from the base station SS pattern generator 19 with the base generated SS pattern and through the base station SS demodulator 27 with the upward base SS modulated signal, a base station synchronizing unit (BS SYNC) 29 synchronises the base generated SS pattern with the upward reception signal to produce a base synchronized SS pattern P'. In other words, the base station synchronizing unit 29 produces the base synchronized SS pattern in synchronism with a base station reception timing of the upward reception signal. Furthermore, the base station synchronizing unit 29 produces a base station delay datum D between the base generated and synchronized SS patterns, namely, between the base station absolute time and reception timing.

By the base synchronized SS pattern, the base station SS demodulator 27 SS demodulates the upward base SS modulated signal into a base station demodulated signal. A base station demodulator (BS DEMOD) 31 demodulates the base station demodulated signal into a base reception signal Sbr for delivery to the base station switch 13.

Supplied from the base station demodulator 31, the base reception signal is judged by a base station detector (BS DETECT) 33 whether or not the base reception signal is really directed to the base station BS. When the base reception signal is directed to the base station, a central processing unit (CPU) 35 delivers a switch control signal to the base station switch 13 in the manner indicated by a dashed line.

In addition, the central processing unit 35 delivers the base station delay datum from the base station synchronizing unit 29 to an encoder 37 for encoding the base station delay datum into an encoded signal for delivery to the base station switch 13. Controlled by the switch control signal, the base station switch 13 inserts the encoded signal into the base transmission signal and eventually into the downward transmission signal S1 as an inserted delay datum. Furthermore, the base station switch 13 delivers the base reception signal to a center signal modulator (C MOD) 39 for modulating the base reception signal into one of the center reception signals.

Figure 2:
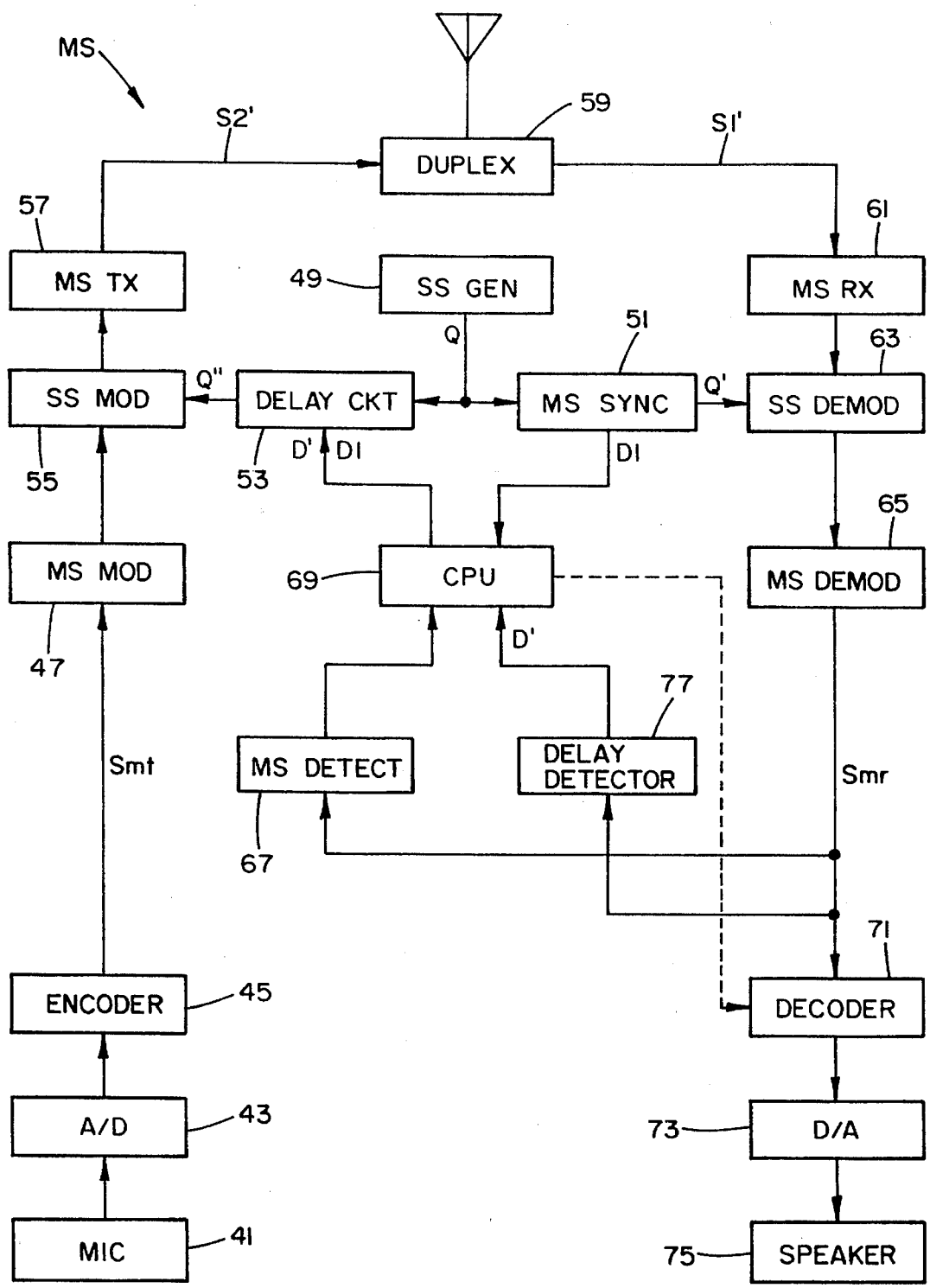
FIG. 2 is a block diagram of a mobile station for use in the code division multiple access communication network mentined in conjunction with FIG. 1.

Referring to FIG. 2, a mobile station MS is one of the above-mentioned mobile stations. The mobile station receives the downward transmission signal S1 as a downward reception signal S1' at a mobile station antenna which is symbolically depicted. Through the mobile station antenna, the mobile station sends an upward transmission signal S2' for reception at the base station BS as the upward reception signal S2.

In the mobile station being illustrated, a microphone (MIC) 41 generates a voice analog signal. An analog-to-digital converter (A/D) 43 converts the voice analog signal to a voice digital signal. An encoder 45 encodes the voice digital signal into an encoded signal for use as a mobile transmission signal Smt. A mobile station modulator (MS MOD) 47 modulates the mobile transmission signal into a mobile station modulated signal.

A mobile station SS pattern generator (SS GEN) 49 generates a mobile generated SS pattern Q in synchronism with a mobile station absolute time t(M) predetermined at the mobile station MS. Like in the base station, a mobile station synchronizing unit (MS SYNC) 51 synchronizes the mobile generated SS pattern with a mobile station reception timing of the downward reception signal S1' to produce a mobile synchronized SS pattern Q' for reception of the downward reception signal in the manner which will presently be described. As will also shortly be described, a transmission timing of the upward transmission signal S2' is determined by using the inserted delay datum of the downward reception signal. In synchronism with the transmission timing, a delay circuit 53 adjusts the mobile generated SS pattern into an adjusted SS pattern Q".

By the adjusted SS pattern, a mobile station SS modulator (SS MOD) 55 modulates the mobile station modulated signal of the mobile station modulator 47 into an upward mobile SS modulated signal. A mobile station transmitter (MS TX) 57 converts the upward mobile SS modulated signal to the upward transmission signal S2'. Through a mobile station duplexer (DUPLEX) 59, the upward transmission signal is fed to the mobile station antenna and is transmitted therefrom towards the base stations including the base station BS.

When received at the mobile station antenna, the downward reception signal S1' is delivered through the mobile station duplexer 59 to a mobile station receiver (MS RX) 61 which produces a downward mobile SS modulated signal. By the mobile synchronized SS pattern Q' supplied from the mobile station synchronizing unit 51, a mobile station SS demodulator (SS DEMOD) 63 SS demodulates the downward mobile SS modulated signal into a mobile station demodulated signal. A mobile station demodulator (MS DEMOD) 65 demodulates the mobile station demodulated signal into a mobile reception signal Smr.

Supplied with the mobile reception signal from the mobile station demodulator 65, a mobile station detector (MS DETECT) 67 judges whether or not the mobile reception signal and consequently the downward reception signal is really directed to the mobile station MS. When the destination station of the downward transmission signal S1 is actually the mobile station MS, a central processing unit (CPU) 69 is put into operation to proceed with the following processings.

The mobile station synchronizing unit 51 is operable like the base station synchronizing unit 29 and processes with reference to the mobile synchronized SS pattern a reception timing D1 of the downward reception signal in response to the mobile reception signal. The central processing unit 69 stores the reception timing in the delay circuit 53 as an initial stored datum only when the mobile station is first put into operation until the initial stored datum is adjusted into an adjusted datum in the manner which will later be described.

When the mobile station MS is the destination station of the downward transmission signal of the base station and consequently of the mobile reception signal, a decoder 71 is put into operation. Delivered from the mobile station demodulator 65, the mobile reception signal is decoded by the decoder 71 into a reproduction of the information signal which may be supplied to the center station from a subscriber station (not shown) connected thereto, through the base station BS from a different one of the mobile stations, or through the center station and the base station BS from a different one of the base stations and which is carried by the downward reception signal S1' as a digital information signal, such as the voice digital signal. A digital-to-analog converter (D/A) 73 converts the reproduction of the voice digital signal to a reproduction of the voice analog signal which drives a loudspeaker (SPEAKER) 75.

It should be noted that the mobile reception signal includes the inserted delay datum inserted into the downward transmission signal at the base station and into the downward reception signal received at the mobile station. Supplied from the mobile station demodulator 65 with the mobile reception signal directed to the mobile station, a delay detector 77 detects the inserted delay datum as a detected delay datum D'. The central processing unit 69 sets the detected delay datum in the delay circuit 53. The mobile generated SS pattern Q is now adjusted into the adjusted SS pattern Q".

Figure 3:
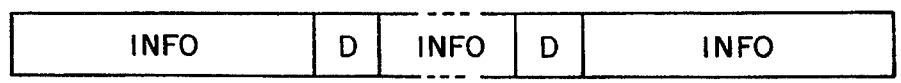
FIG. 3 shows a format of a downward transmission signal transmitted from the base station depicted in FIG. 1 to the mobile station of FIG. 2.

Turning to FIG. 3, the information signal is carried by the downward transmission signal S1 and consequently by the downward reception signal S1' in frames in the manner indicated by a legend INFO. The base station delay datum D is inserted as the inserted delay datum in each frame as indicated by the reference symbol D and therefore in the downward transmission and reception signals in a time division fashion. Although not depicted in detail, the information signal may include in at least one of the frames an identification number or code of the mobile station used as the destination station and other signals, such as a frame synchronization signal.

Figure 4:
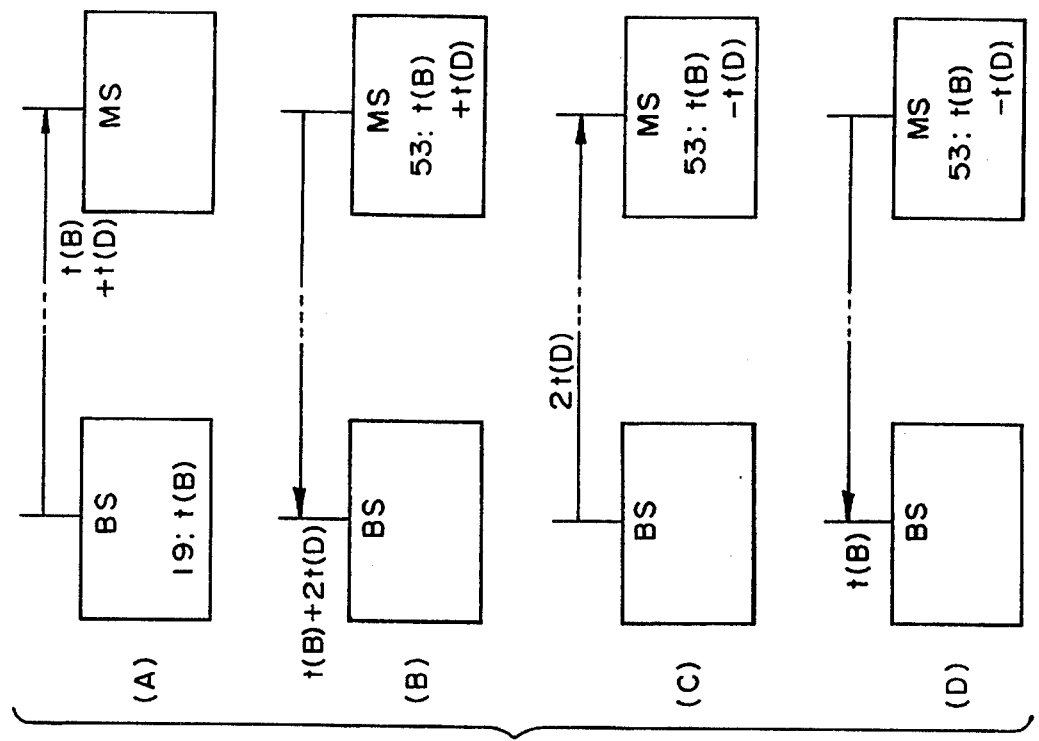
FIGS. 4 (A) through (D) show the code division multiple access communication network when the mobile station is at a certain distance from the base station.

Referring to FIG. 4 (A) through FIG. 4 (D) and again to FIGS. 1 and 2, the mobile station MS is at a certain distance from the base station BS and is put into a preliminary state in FIGS. 4 (A) and (B) and then in a steady state in FIG. 4 (C) to be kept in the steady state in FIG. 4 (D). It should be noted that signals, such as the downward and the upward transmission signals, may be propagated through at least one communication satellite although depicted as if directly propagated. The mobile station is put into the preliminary state either upon initial turn on of a power switch (not shown) or when the mobile station begins to receive the downward reception signal either from the base station through a different communication satellite or from a different base station. The propagation delay will be represented by t(D).

In FIG. 4 (A), it is presumed that the power switch is turned on in the mobile station so that the mobile receiver 61 receives as the downward reception signal S1' the downward transmission signal S1 which the base station transmits with the base station SS pattern generator 19 made to generate the base generated SS pattern P at or in synchronism with the base station absolute time t(B) as indicated by a legend "19: t(B)". When the mobile station detector 67 judges that the mobile reception signal Smr is directed to the mobile station, the central processing unit 69 stores the reception timing D1 in the delay circuit 53 as the initial stored datum, which represents t(B) plus t(D) as the reception timing of the downward reception signal in the manner so labelled adjacent to the mobile station.

In FIG. 4 (B), the mobile station transmits the upward transmission signal S2' back to the base station by using a mobile initial SS pattern which is produced from the delay circuit 53 at or in synchronism with the reception timing of the downward reception signal, namely, by using the initial stored datum as indicated by a legend "53: t(B)+t(D)". At the base station, the upward reception signal S2 is received at its reception timing which is equal to t(B) plus 2t(D) as so labelled near the base station. The base station synchronizing unit 29 produces a delay value 2t(D) as the base station delay datum.

In FIG. 4 (C), the base station transmits to the mobile station the downward transmission signal by processing the base transmission signal Sbt into which the base station switch 13 inserts the encoded signal representative of the delay value. Detected in the mobile station in the mobile reception signal Smr directed thereto, the delay value of the downward reception signal is additionally stored in the delay circuit 53 as the detected delay datum D'. Subtracting the detected delay datum from the initial stored datum, the delay circuit 53 provides the adjusted delay datum which is equal to t(B)–t(D), namely, equal to the base station absolute time minus the propagation delay as indicated by a legend "53: t(B)–t(D)". The delay circuit 53 now produces the adjusted SS pattern Q".

In FIG. 4 (D), the mobile station transmits to the base station the upward transmission signal by using the adjusted SS pattern which is produced by adjusting the mobile generated SS pattern Q by the delay circuit 53 in compliance with the adjusted datum. The base station receives the upward transmission signal as the upward reception signal with the propagation delay, namely, at its reception timing which is equal to the base station absolute time t(B) as labelled adjacent to the base station. It is now appreciated that synchronism is completely established at the base station between the downward transmission signal and the upward reception signal.

Figure 5:
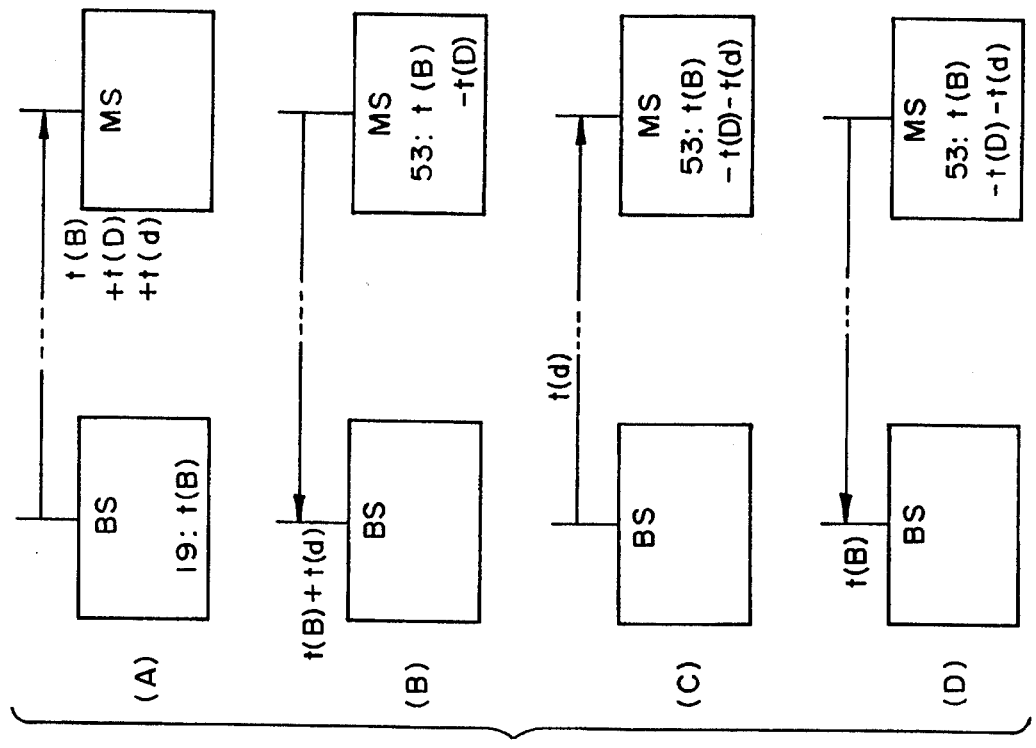
FIGS. 5 (A) through (D) show the code division multiple access communication network when the mobile station moves to a different distance from the base station.

Turning to FIG. 5 (A) through FIG. 5 (D) with FIGS. 1 and 2 continuously referred to, the mobile station moves from the above-mentioned distance to another distance greater by an increment in the distance and is kept at the steady state. The propagation delay accordingly becomes greater by a propagation delay increment t(d).

In FIG. 5 (A), the base station transmits the downward transmission signal to the mobile station by using the base generated SS pattern generated at or in synchronism with the base station absolute time t(B). The mobile station receives the downward reception signal at a different timing which is equal to a sum of three terms the base station absolute time t(B), the propagation delay t(D), and the propagation delay increment t(d) in the manner so labelled adjacent to the mobile station.

In FIG. 5 (B), the delay circuit 53 is loaded with the adjusted datum which is equal to t(B) minus t(D) in the manner indicated by a legend "53: t(B)–t(D)". The mobile station transmits to the base station the upward transmission signal. The base station receives the upward reception signal with a total propagation delay t(D) plus t(d) at its reception timing which is equal to t(B) plus t(d) as so labelled near the base station. The base station synchronizing unit 29 produces the propagation increment t(d) as the base station delay datum.

In FIG. 5 (C), the base station transmits the downward transmission signal including the encoded signal representative of the inserted delay datum which is equal to t(d). Detected at the mobile station in the mobile reception signal directed thereto, the detected delay datum of t(d) is additinally stored in the delay circuit 53. Subtracting the detected delay datum from the adjusted datum stored in the delay circuit 53 up to this time instant, the delay circuit 53 is then loaded with the adjusted datum which is now equal to t(B) minus t(D) minus t(d) as indicated by a legend "53: t(B)–t(D)–t(d)". In compliance with this adjusted datum, the delay circuit 53 produces the adjusted SS pattern.

In FIG. 5 (D), the mobile station transmits to the base station the upward transmission signal by using the adjusted SS pattern of the adjusted datum t(B) minus t(D) minus t(d). The base station receives the upward reception signal with an eventual reception timing which is equal to an algebraic sum of t(B) minus t(D) minus t(d) plus t(D) plus t(d), namely, equal to the base station absolute time t(B). It is now clearly appreciated that synchronism is kept completely at the base station between the downward transmission signal and the upward reception signal both in the preliminary and the steady states of operation and furthermore relative to like upward reception signals received from the mobile stations which are in radio communication with the base station.

While this invention has thus far been described in specific conjunction with a code division multiple access communication method according to a single preferred embodiment thereof and a base and a mobile station used in implementing the code division multiple access communication method, it will now be readily possible for one skilled in the art to put this invention into effect in various other manners. It should be noted in this connection that the "increment" may be a minus increment, namely, a decrement.

What is claimed is:

1. A code division multiple access communication method comprising the steps of generating at a base station a base generated spectrum spread pattern, modulating a base transmission signal by said base generated spectrum spread pattern into a downward transmission signal for reception at a mobile station as a downward reception signal, synchronizing said base generated spectrum spread pattern with an upward reception signal received from said mobile station to produce a base synchronized spectrum spread pattern, demodulating said upward reception signal by said base spectrum spread pattern into a base reception signal, generating at said mobile station a mobile generated spectrum spread pattern, modulating a mobile transmission signal by using said mobile generated spectrum spread pattern as an adjusted spectrum spread pattern into an upward transmission signal for reception at said base station as said upward reception signal, synchronizing said mobile generated spectrum spread pattern with said downward reception signal to produce a mobile synchronized spectrum spread pattern, and demodulating said downward reception signal by said mobile synchronized spectrum spread pattern into a mobile reception signal, wherein said code division multiple access communication method comprises the steps of:

detecting at said base station a base station delay datum between said base generated and synchronized spectrum spread patterns;

inserting said base station delay datum into said downward transmission signal as an inserted delay datum; and adjusting at said mobile station said mobile generated spectrum spread pattern into said adjusted spectrum spread pattern in response to said inserted delay datum.

2. The code division multiple access communication method as claimed in claim 1, wherein said inserting step inserts said inserted datum into said downward transmission signal in a time division fashion.

3. The code division multiple access communication method as claimed in claim 2, wherein said adjusting step comprises the steps of:

detecting said inserted delay datum from said mobile reception signal as a detected delay datum;

storing said detected delay datum as a stored delay datum; and adjusting said mobile generated spectrum spread pattern into said adjusted spectrum spread pattern in response to said stored delay datum.

4. The code division multiple access communication method as claimed in claim 1, said base generated spectrum spread pattern being generated in synchronism with a base station absolute time, wherein:

said base station receives said upward reception signal with a propagation delay increment dependent on an increment in a distance between said base and said mobile stations relative to a transmission timing of said upward transmission signal at said mobile station after said mobile station is put in a steady state of operation;

said detecting step detecting said propagation delay increment as said base station delay datum;

said inserting step inserting said propagation delay increment as said inserted delay datum;

said adjusting step producing said adjusted spectrum spread pattern at an adjusted time which is equal to said base station absolute time minus said propagation delay increment.

5. The code division multiple access communication method as claimed in claim 4, wherein:

said base station receives said upward reception signal with a propagation delay dependent on a distance between said base and said mobile stations relative to a transmission timing of said upward transmission signal at said mobile station while said mobile station is in a preliminary state after first receiving said downward reception signal and before being put in said steady state;

said detecting step detecting said propagation delay as said base station delay datum;

said inserting step inserting said propagation delay as said inserted delay datum;

said adjusting step producing said adjusted spectrum spread pattern at an adjusted time which is equal to said base station absolute time minus said propagation delay.

6. A base station which is for use in a code division multiple access communication network comprising a mobile station and which comprises a spectrum spread pattern generator for generating a base generated spectrum spread pattern, modulator means for modulating a base transmission signal by said base generated spectrum spread pattern into a downward transmission signal for reception at said mobile station as a downward reception signal, synchronizing means for synchronizing said base generated spectrum spread pattern with an upward transmission signal received from said mobile station as an upward reception signal to produce a base synchronized spectrum spread pattern, and demodulator means for demodulating said upward reception signal by said base synchronized spectrum spread pattern into a base receptions signal, wherein said base station further comprises:

detecting means for detecting a base station delay datum between said base generated and synchronized spectrum spread patterns and;

inserting means for inserting said base station delay datum into said downward transmission signal as an inserted delay datum to adjust, at said mobile station, a mobile generated spectrum spread pattern into an adjusted spectrum spread pattern in response to said inserted delay datum.

7. The base station as claimed in claim 6, wherein said inserting means inserts said base station delay datum into said downward transmission signal in a time division fashion.

8. The base station as claimed in claim 7, said demodulator means comprising a receiver unit for receiving said upward reception signal as an upward base station signal, a spectrum spread demodulator for demodulating said upward base station signal by said base synchronized spectrum spread pattern into a base spectrum spread signal, a demodulator unit for demodulating said base spectrum spread signal into a base demodulated signal, a switch supplied with said base demodulated signal, and detector means for detecting whether or not said base demodulated signal is directed to said base station, said detector means producing a switch control signal for making said switch produce said base demodulated signal as said base reception signal when said base demodulated signal is directed to said base station, wherein said detecting means comprises:

an encoder for encoding a supplied datum into an encoded signal; and a central processing unit supplying said encoder with said base station delay datum as said supplied datum to deliver said encoded signal to said switch, said switch control signal making said switch insert said encoded signal into said downward transmission signal as said inserted datum.

9. The base station as claimed in claim 6, said spectrum spread pattern generator generating said base generated spectrum spread pattern in synchronism with a base station absolute time, wherein:

said base station receives said upward reception signal with a propagation delay increment dependent on an increment in a distance between said base and said mobile stations relative to a transmission timing of said upward transmission signal at said mobile station after said mobile station is put in a steady state of operation;

said detecting means detecting said propagation delay increment as said base station delay datum.

10. The base station as claimed in claim 9, wherein said base station receives said upward reception signal with a propagation delay dependent on said distance relative to said transmission timing while said mobile station is put in a preliminary state after first receiving said downward transmission signal and before being put in said steady state;

said detecting means detecting said propagation delay as said base station delay datum.

11. A mobile station for use in a code division multiple access communication network comprising a base station comprising, in turn, a base station spectrum spread pattern generator for generating a base generated spectrum spread pattern, base station modulator means for modulating a base transmission signal by said base generated spectrum spread pattern into a downward transmission signal for reception at said mobile station as a downward reception signal, base station synchronizing means for synchronizing said base generated spectrum spread pattern with an upward reception signal received from said mobile station to produce a base synchronized spectrum spread pattern, and base station demodulator means for demodulating said upward reception signal by said base synchronized spectrum spread pattern into a base reception signal, and further comprising detecting means for detecting a base station delay datum between said base generated and synchronized spectrum spread patterns and inserting means for inserting said base station delay datum into said downward transmission signal as an inserted delay datum, and which comprises a mobile station spectrum spread pattern generator for generating a mobile generated spectrum spread pattern, mobile station modulator means for modulating a mobile transmission signal by said mobile generated spectrum spread pattern as an adjusted spectrum spread pattern into an upward transmission signal for reception at said base station as said upward reception signal, mobile station synchronizing means for synchronizing said mobile generated spectrum spread pattern with said downward reception signal to produce a mobile synchronized spectrum spread pattern, and mobile station demodulator means for demodulating said downward reception signal by said mobile synchronized spectrum spread pattern into a mobile reception signal, wherein said mobile station comprises adjusting means for adjusting said mobile generated spectrum spread pattern into said adjusted spectrum spread pattern in response to said inserted delay datum.

12. The mobile station as claimed in claim 11, wherein said inserted delay datum is inserted in said downward reception signal in a time division fashion.

13. The mobile station as claimed in claim 12, said mobile station comprising a demodulator unit for demodulating said downward reception signal by said mobile synchronized spectrum spread pattern into a mobile demodulated signal and mobile station detector means for judging whether or not said mobile demodulated signal is directed to said mobile station as said mobile reception signal, wherein said mobile station comprises:

a delay detector for detecting said inserted delay datum as a detected delay datum in said mobile reception signal; and a delay circuit responsive to said detected delay datum for adjusting said mobile generated spectrum spread pattern into said adjusted spectrum spread pattern.

14. The mobile station as claimed in claim 11, said base station spectrum spread pattern generator generating said base generated spectrum spread pattern in synchronism with a base station absolute time, wherein:

said base station receives said upward reception signal with a propagation delay increment dependent on an increment in a distance between said base and said mobile stations relative to a transmission timing of said upward transmission signal at said mobile station after said mobile station is put in a steady state of operation;

said base station delay datum being equal to said propagation delay increment;

said adjusting means producing said adjusted spectrum spread pattern at an adjusted time which is equal to said base station absolute time minus said propagation delay increment.

15. The mobile station as claimed in claim 14, wherein:

said base station receives said upward reception signal with a propagation delay dependent on said distance relative to said transmission timing while said mobile station is put in a preliminary state after first receiving said downward reception signal, and before being put in said steady state;

said base station delay datum being equal to said propagation delay;

said adjusting means producing said adjusted spectrum spread pattern at an adjusted time which is equal to said base station absolute time minus said propagation delay.

* * * * *